United States Patent

Wong et al.

[15] 3,661,676

[45] May 9, 1972

[54] PRODUCTION OF SINGLE CRYSTAL ALUMINUM OXIDE

[72] Inventors: Philip Wong, Boston; Donald R. Messier, Marblehead, both of Mass.

[73] Assignee: The United States of America as represented by the Secretary of the Army

[22] Filed: May 4, 1970

[21] Appl. No.: 34,290

[52] U.S. Cl. ................. 156/304, 156/305, 156/325, 23/142
[51] Int. Cl. ........................................... B29c 19/00
[58] Field of Search ............. 23/142; 156/304, 305, 157

[56] References Cited

UNITED STATES PATENTS

| 3,365,316 | 1/1968 | Kingery et al. | 23/142 X |
| 3,418,076 | 12/1968 | Campbell | 23/142 |
| 3,130,008 | 4/1964 | Stokes et al. | 23/142 X |
| 2,990,249 | 6/1961 | Wagner | 23/142 |

*Primary Examiner*—Herbert T. Carter
*Attorney*—Harry M. Saragovitz, Edward J. Kelly and Herbert Berl

[57] ABSTRACT

A method for the production of large single-crystals of $Al_2O_3$ comprising the positioning of several small single-crystals of $Al_2O_3$ on a substrate in a chamber, the catalytic oxidation of $AlCl_3$ in the presence of water vapor in the chamber and adjacent to the surfaces of the small single-crystals of $Al_2O_3$ to form $Al_2O_3$ and HCl gas. The produced $Al_2O_3$ being deposited on the surfaces of the small single crystals of $Al_2O_3$ to form a large single-crystal of $Al_2O_3$.

3 Claims, 2 Drawing Figures

Patented May 9, 1972

3,661,676

INVENTORS,
Philip Wong
Donald R. Messier
BY: Harry M. Saragovitz,
Edward J. Kelly + Herbert Berl
Attorneys.

PRODUCTION OF SINGLE CRYSTAL ALUMINUM OXIDE

The invention described herein may be manufactured, used, and licensed by or for the Government for governmental purposes without the payment to us of any royalty thereon.

This invention relates in general to a method for the welding of ceramic materials and more particularly to the joining of single-crystals of $Al_2O_3$ by chemical vapor deposition means in order to form a larger, single-crystal of $Al_2O_3$.

The starting material single-crystal $Al_2O_3$ may be prepared in any conventional manner. Aluminum hydroxide is first prepared by the addition of an alkali to a solution of aluminum salt. The dried $Al(OH)_3$ is then subjected to calcination and the produced $Al_2O_3$ recovered. The single crystals of $Al_2O_3$, which are commercially available, are prepared by subjecting the $Al_2O_3$ to a temperature above its melting point, seeding and cooling. However, the melting and cooling method results in the production of single-crystal $Al_2O_3$ which has limited dimensions, e.g., around 3 inches in diameter. Larger, single-crystals $Al_2O_3$ are desired, e.g., for utilization as a window in an armor vehicle.

It is an object of this invention to provide and disclose a simple method for the production of large, single-crystal $Al_2O_3$.

It is a further object of this invention to provide and disclose a method for the production of large, single-crystal $Al_2O_3$ comprising the joining of several smaller pieces of said materials.

Other objects and a fuller understanding of the invention may be had by referring to the following description and claims, taken in conjunction with the accompanying drawing in which:

Figure 1:
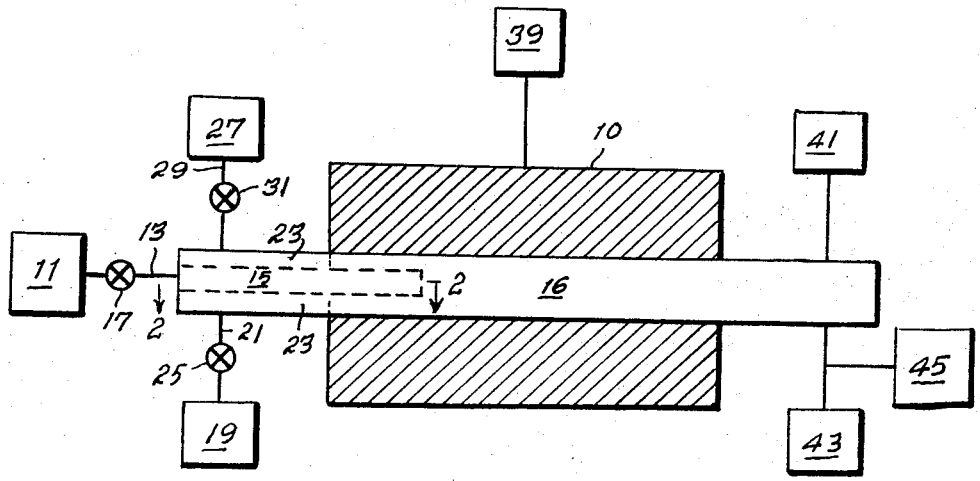
FIG. 1 shows a schematic representation of the system utilized in the process.
Figure 2:
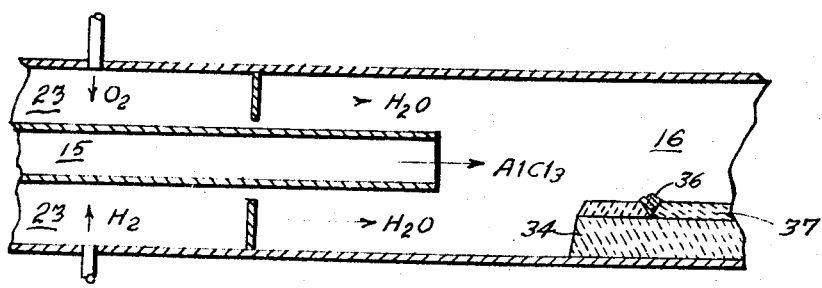
FIG. 2 shows a sectional view through 2—2 of FIG. 1 with the material to be joined positioned in chamber 16.

The method generally comprises the cementing of several single-crystals of $Al_2O_3$ material to be joined onto a polycrystalline alumina substrate that forms the bottom of a deposition chamber. $AlCl_3$ gas and water vapor react at the surfaces of the abutting single crystals to form solid $Al_2O_3$ and HCl gas. The latter product is continuously removed by the flowing gas stream.

Referring now to the drawings, the aluminum chloride gas is produced by passing chlorine over aluminum metal at a temperature of approximately 180° C. in generator 11. The generated aluminum chloride gas is then conducted by means 13 into concentric tubing or nozzle 15 of resistance furnace 10. Concentric tubing 15 is encompassed by aluminum oxide tube 16 which serves as the deposition chamber. The flow of the produced aluminum chloride gas into concentric tubing 15 is controlled by valve 17. The $H_2$, which is stored in container 19, is conducted through means 21 into annular space 23. The flow of $H_2$ is controlled by valve 25. $O_2$, which is stored in container 27, is conducted through means 29 into annular space 23 wherein it reacts with $H_2$ to form water vapor. The flow of $O_2$ is controlled by means of valve 31. Aluminum chloride exits from concentric tubing 13 into deposition chamber 16 wherein it reacts at elevated temperatures with the water vapor, which has been formed by the combination of $O_2$ and $H_2$, to form aluminum oxide and hydrogen chloride gas. The design of the system is such that the aluminum chloride and water vapor do not intermix until they reach the substrate wherein the deposition takes place. The formed aluminum oxide, designated 36, is deposited on the aluminum oxide material 37 thereby forming a single-crystal of aluminum oxide.

The chlorine gas is introduced into reactor 11 which contains aluminum metal at the rate of 0.12 liters per minute and the formed aluminum chloride introduced into concentric tubing 15 of resistance furnace 10 at the same rate. The $H_2$ is introduced into annular space 23 at the rate of 0.77 liters per minute. $O_2$ is introduced into annular space 23 at the rate of 0.57 liters per minute. The total gas flowrate is 1.5 liters per minute.

The temperature of resistance furnace 10 is controlled by any suitable means, e.g., potentiometer 39. Potentiometer 39 is connected to any conventional power source. The temperature of the system is indicated by any conventional means, e.g., optical pyrometer 41. A vacuum, as measured by manometer 42, is maintained on the system by means of vacuum pump 43.

In an illustrative run, two pieces of a single-crystal $Al_2O_3$ material having a thickness of 1.5mm and partially beveled ends were mechanically butted together and cemented to the substrate 34 vesting in aluminum oxide tube 16. Aluminum chloride, hydrogen and oxygen were introduced into the system at the above specified rate. The process was continued for a period of 6 hours at a temperature of 1,500° to 1,600° C. under a pressure of 0.5 to 1.0 torr. The joined single-crystal material was recovered and was examined. A deposit of 0.6mm was obtained.

The amount of deposit is dependent upon the length of the process. If a thicker deposit is desired, the process may be continued for a longer period of time. The process may be carried out at temperatures of between 1,500° to 1,800° C. Temperatures below 1,500° C. are to be avoided in that the utilization thereof may result in an undesired, columnar grained, polycrystalline deposit. In addition low pressures of not more than about 1.0 torr are required in order to obtain the desired deposits.

Although we have described our invention with a certain degree of particularity, we wish it to be understood that we do not desire to be limited to the exact conditions shown and described for obvious modifications will occur to a person skilled in the art.

Having described our invention, we claim:

1. A method for the production of a single-crystal of aluminum oxide comprising selecting at least two pieces of single-crystal aluminum oxide, positioning said pieces with abutting ends on a substrate in a system, passing gaseous aluminum chloride, oxygen and hydrogen into the system at a rate of about 0.12, 0.57, and 0.77 liters per minute, respectively, contacting the gaseous aluminum chloride and formed water vapor at a point proximate to the surfaces of the crystals at a temperature of about 1,500° to 1,800° C. and a pressure of not more than 1.0 torr, whereby aluminum oxide is formed and deposited on the surface of the abutting ends of the crystals thereby joining them together.

2. A method in accordance with claim 1, wherein the reaction is continued for a period of 6 hours.

3. A method in accordance with claim 2 wherein the total gas flow is at the rate of 1.5 liters per minute.

* * * * *